(12) United States Patent
Charles et al.

(10) Patent No.: US 11,619,645 B2
(45) Date of Patent: Apr. 4, 2023

(54) BUMPER WITH MARKING CELL CAVITY COMMUNICATING WITH THE EXTERIOR

(71) Applicant: Airbus SAS, Blagnac (FR)

(72) Inventors: Julien Charles, Toulouse (FR); Guillaume Ferrer, Toulouse (FR)

(73) Assignee: AIRBUS SAS, Toulouse (FR)

( * ) Notice: Subject to any disclaimer, the term of this patent is extended or adjusted under 35 U.S.C. 154(b) by 1008 days.

(21) Appl. No.: 16/400,417

(22) Filed: May 1, 2019

(65) Prior Publication Data
US 2019/0339297 A1    Nov. 7, 2019

(30) Foreign Application Priority Data

May 4, 2018 (FR) ...................................... 1853846

(51) Int. Cl.
*B60R 19/02* (2006.01)
*G01P 1/07* (2006.01)
*B60R 19/03* (2006.01)
*G01P 1/12* (2006.01)

(52) U.S. Cl.
CPC .............. *G01P 1/07* (2013.01); *B60R 19/023* (2013.01); *B60R 19/03* (2013.01); *G01P 1/12* (2013.01)

(58) Field of Classification Search
CPC . G01P 1/07; G01P 1/12; B60R 19/023; B60R 19/03; B60R 19/48; B60R 21/01; B60R 19/483; B60R 21/013; B60R 21/00; B62D 41/00; C09B 11/08; C09K 11/00

USPC .......................................................... 293/120
See application file for complete search history.

(56) References Cited

U.S. PATENT DOCUMENTS

| 1,834,824 | A | * | 12/1931 | Brown ..................... B60R 19/20 293/120 |
| 2,646,016 | A |   | 7/1953 | Wilson |
| 11,125,880 | B2 | * | 9/2021 | Send ..................... H04N 9/0451 |
| 2013/0197717 | A1 |   | 8/2013 | Fraser et al. |

FOREIGN PATENT DOCUMENTS

| DE | 2935786 A1 | * | 4/1981 |
| JP | H0280467 A |   | 3/1990 |
| KR | 101901853 B1 | * | 9/2018 |
| WO | 0051875 A1 |   | 9/2000 |
| WO | WO-0051875 A1 | * | 9/2000 | ............... B60Q 1/32 |

OTHER PUBLICATIONS

French Search Report; priority document.

* cited by examiner

*Primary Examiner* — Pinel E Romain
(74) *Attorney, Agent, or Firm* — Greer, Burns & Crain, Ltd.

(57) ABSTRACT

A bumper for a vehicle, comprising at least one part made of resilient material, having a curved front portion forming an inner cavity. The front portion has apertures enabling the cavity to be put into communication with the exterior of the resilient part. At least one marking fluid cell is provided inside the cavity. A fastener is provided to fasten the one part to the vehicle.

5 Claims, 3 Drawing Sheets

US 11,619,645 B2

BUMPER WITH MARKING CELL CAVITY COMMUNICATING WITH THE EXTERIOR

CROSS-REFERENCES TO RELATED APPLICATIONS

This application claims the benefit of the French patent application No. 1853846 filed on May 4, 2018, the entire disclosures of which are incorporated herein by way of reference.

FIELD OF THE INVENTION

The present invention relates to the field of bumpers, more particularly bumpers for vehicles. The present invention is more particularly concerned with bumpers incorporating a system for revealing an impact of the vehicle on a surface of any kind.

BACKGROUND OF THE INVENTION

Collisions may occur between ground support vehicles (referred to in English as GSE, for Ground Service Equipment) and aircraft. Some aircraft may have areas in which such an impact has an effect on the structure, for example the fuselage structure, that cannot be detected with the naked eye.

An object of the present invention is to propose a vehicle bumper equipped with a system for marking in case of collision, which allows the system to be replaced easily and rapidly if the marking is activated.

SUMMARY OF THE INVENTION

For this purpose, the present invention proposes a vehicle bumper comprising at least one part made of resilient material, having a curved front portion forming an inner cavity, the front portion having apertures enabling the cavity to be put into communication with the exterior of the resilient part, at least one marking fluid cell being provided inside the cavity, and wherein the invention also comprises fastening means designed for fastening the vehicle bumper to the vehicle.

Thus, it is simply necessary to replace the bumper in order to bring the vehicle back into operation, and this may be done rapidly and easily.

The bumper has at least one of the following optional characteristics, considered separately or in combination.

The cell or cells comprise a casing made of a material and having dimensions such that the cell casing breaks under the effect of a specified pressure.

The marking fluid cells are kept facing the apertures by means of a structural frame, the cells being sandwiched between the frame and the front portion.

The cells are at least partially positioned along the inner curvature of the front portion, facing the apertures.

The apertures are of cylindrical shape with a circular cross section.

The cell comprises a constricted part in which is provided a piston whose rod is connected to the front part, the other part of the cell being provided with at least one hole linked to an aperture by a flexible tube.

The piston head is located facing an aperture, and the piston rod is hollow and connects a hole in the piston head to the aperture.

The cells are filled with a marking fluid having a viscosity such that the fluid can be discharged through the apertures.

The present invention also relates to the vehicle equipped with a bumper having at least one of the optional characteristics presented above, considered separately or in combination, the resilient part being positioned at least partially in the outer peripheral part.

The present invention also relates to a method for marking a surface, in which a vehicle having at least one of the optional characteristics described above, considered separately or in combination, is involved in a collision, such that, at the time of the impact, the front part of the bumper exerts a pressure on the cell or cells, allowing the marking fluid to flow through at least one aperture.

BRIEF DESCRIPTION OF THE DRAWINGS

Other objects, advantages and characteristics of the invention will be apparent from a perusal of the following description, which is provided by way of non-limiting example, with reference to the attached drawings, in which.

DETAILED DESCRIPTION OF THE PREFERRED EMBODIMENTS

The vehicle 2 shown for illustrative purposes in the following description is a vehicle of the ground support equipment type. Such a vehicle may be, for example, a towing vehicle for moving the aircraft on the ground, a vehicle for transporting a baggage conveyor, a vehicle for transporting baggage or baggage containers, freight, passengers, airport personnel or company personnel, a tanker for supplying the aircraft with water, fuel or other substances, a catering vehicle for loading and unloading trolleys for example, a vehicle for replenishing drinking or other water, a toilet emptying vehicle, a vehicle for transporting the passenger embarkation/disembarkation steps, etc. The present invention may relate to any other type of vehicle.

In the description, the term "transverse" is taken to mean the direction of the width of the vehicle, the term "longitudinal" is taken to mean a direction perpendicular to the transverse direction, that is to say, in the direction of the length of the vehicle. The direction perpendicular to both the transverse and the longitudinal direction is denoted by the expression "height" and corresponds to the vertical direction.

Figure 1:
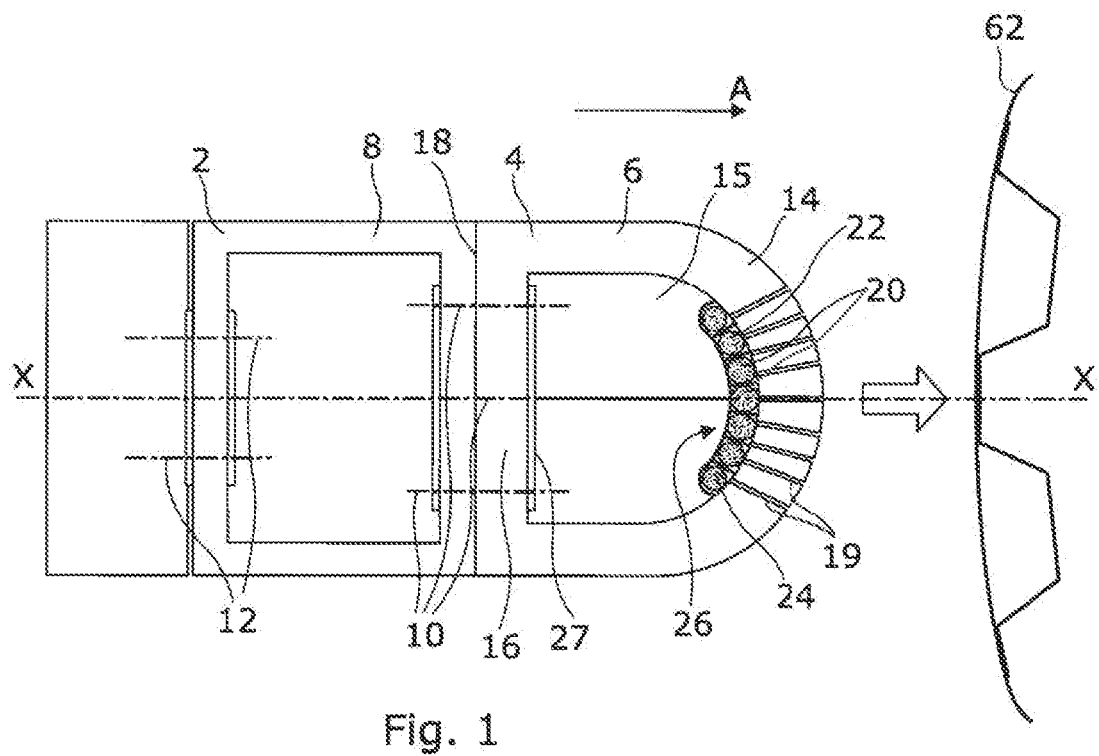
FIGS. 1 to 3 show a simplified schematic view in vertical longitudinal section of a ground support vehicle which is, respectively, approaching an aircraft fuselage, in collision with the latter, and moving away from the fuselage after the collision, and which is provided with a bumper according to the present invention.

The terms "front" and "rear" are to be interpreted relative to the direction of advance of the vehicle, this direction being represented by an arrow A in FIG. 1.

Figure 2:
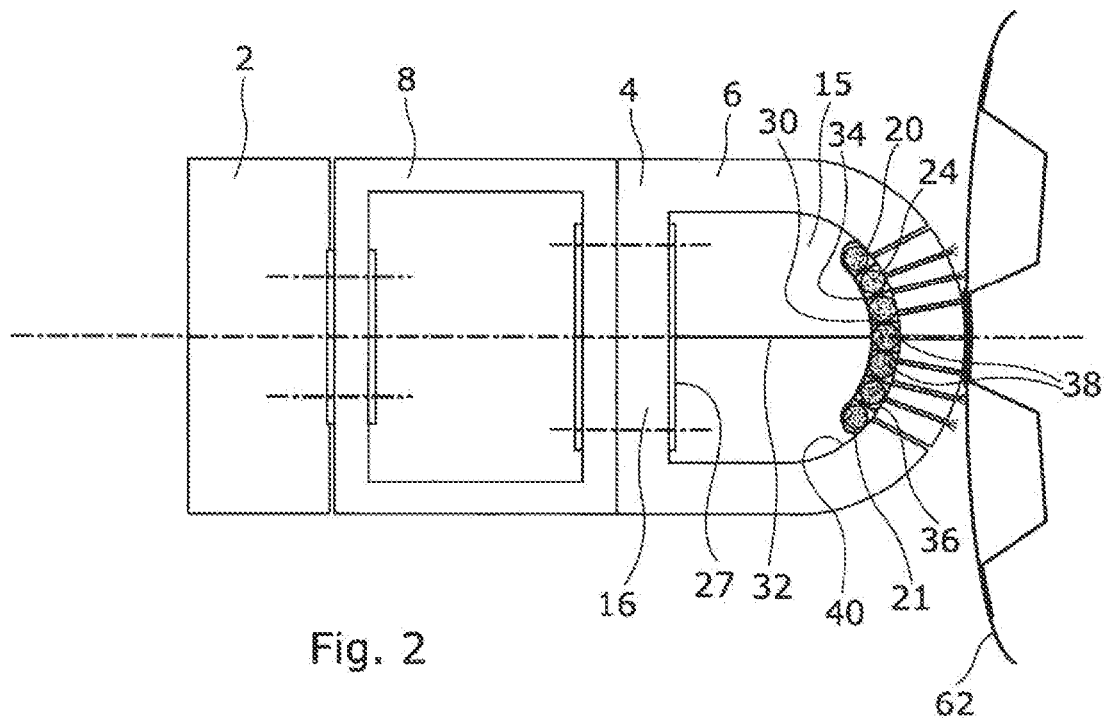
Figure 3:
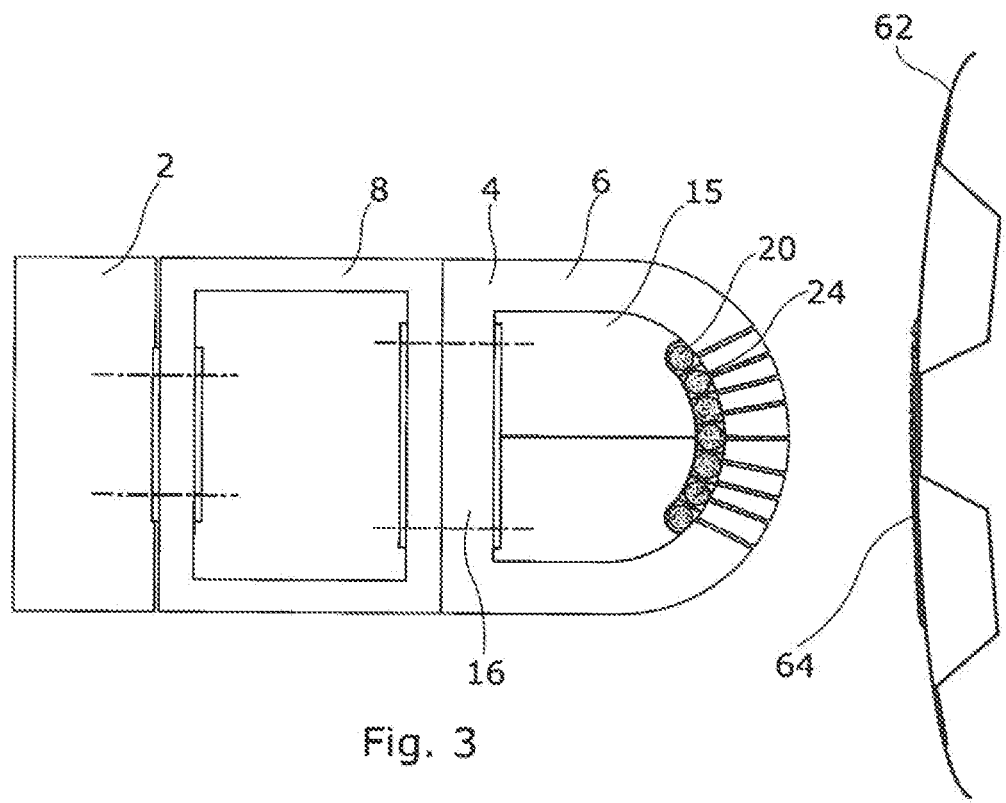
Figure 4:
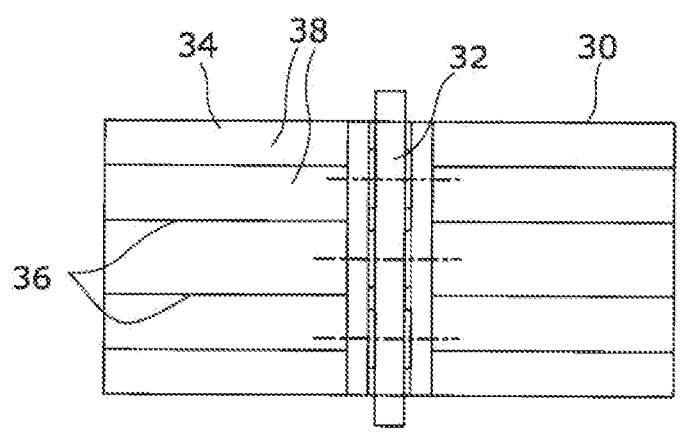
FIG. 4 shows a simplified rear view of part of the structural frame supporting marking cells.

According to the embodiment shown in FIGS. 1 to 3, the vehicle 2 comprises a bumper 4 having at least one resilient part 6. It also comprises a non-resilient part 8 forming a structural framework which contributes to the rigidity and to the transmission of forces, and to which the resilient part 6 is fastened by any kind of means. The non-resilient part 8 is referred to below as the structural part. The resilient part 6 is positioned at least partially in the outer peripheral part at the position of the bumper. In other words, the resilient part 6 is positioned longitudinally at least partially at the outer end position of the bumper. In the illustrated embodiment, broken lines indicate a screw joint 10 of a conventional type; any other type of fastening may be used. In the illustrated embodiment, the fastening of the resilient part 6 to the structural part 8 is detachable. The resilient part 6 may easily be separated from the structural part 8 without damaging the latter, and withdrawn from the vehicle 2. In the present case, a screw joint 10 is used, and a simple unscrewing operation therefore suffices to separate the resilient part from the vehicle 2. Similarly, as shown in FIGS. 1 to 3, the structural part 8 is itself fastened by any kind of means to the bodywork of the vehicle 2, for example in the same way as the resilient part 6; broken lines indicate a screw joint 12 of a conventional type, allowing the structural part 8 to be easily detached, with or without the resilient part 6, depending on whether or not it has itself been detached.

The resilient part 6 of the bumper 4 has the function of absorbing frontal impacts by its elastic deformation when under stress; if the impact has not been too severe, it subsequently returns to its initial shape and size, having prevented damage to the vehicle.

By way of illustration, the structural part 8 may be made of metal and the resilient part 6 may be formed of a material such as rubber.

According to another embodiment, the bumper 4 has a resilient part 6 but no non-resilient part. The resilient part 6 is directly fastened to the bodywork of the vehicle 2. The bodywork of the vehicle then forms the structural part 8.

FIGS. 1 to 3 show longitudinal sections through the vehicle 2 taken along a vertical plane which is central to the vehicle. Throughout the rest of the description, it is assumed that the vehicle 2 is resting on a horizontal ground and that any direction perpendicular to the ground is vertical. In a conventional way, the bumper 4 extends transversely at the front of the vehicle 2 over most of the width of the latter, or possibly beyond it, with curvatures on either side of the vehicle to follow its contours.

As shown in FIGS. 1 to 3, the resilient part 6 has a hollow convex shape. The resilient part 6 comprises a front portion 14, having, at least partially, a curvature of convex cross section forming an interior cavity 15. In the illustrated embodiment, it also has a flat rear portion 16, called the base. The resilient part 6 has a D-shaped cross section; the base 16 forms the linear bar of the D and is designed to bear against a flat surface 18 of the structural part 8 for the purpose of fastening thereto. In this embodiment, the cavity 15 corresponds to the interior of the D.

The front portion 14 comprises openings 19 for putting the cavity 15 into communication with the exterior of the resilient part. The openings 19 each have one end opening into the cavity 15 and the other opening to the exterior of the bumper. The direction followed from one end to the other is referred to as a longitudinal direction, and the cross section of the aperture is taken in a plane transverse to this longitudinal direction. The apertures have small transverse dimensions relative to the thickness of the front portion measured in the longitudinal direction. In the illustrated embodiment, the apertures take the form of cylindrical channels 19 with a circular cross section; the diameter of the apertures is, as mentioned above, smaller than the length of the channel 19.

The distance between the outer ends, opening into the exterior environment, of two neighboring channels is greater than the distance between their inner ends which open into the cavity 15. The channels 19 are, for example, positioned radially.

The cavity 15 contains at least one cell 20 of marking fluid 22. The cell 20 has any type of shape that can form a marking fluid storage reservoir 24.

In the embodiment shown in FIGS. 1 to 3, the cells 20 have a generally spherical shape. The cells comprise a casing 21 made of a material and having dimensions enabling the cell to break under the effect of a specified pressure. The material could, for example, be chosen from a plastic. The cell 20 is at least partially filled with the marking fluid 22.

Figure 6:
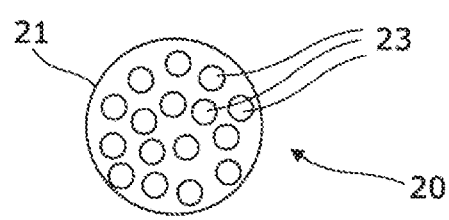
FIG. 6 shows a simplified cross section of a marking cell containing balls of marking fluid according to another embodiment.

Alternatively, as shown in FIG. 6, the liquid may be contained in balls 23 housed inside the cell 20. Regardless of the embodiment, the balls 23 break under the specified pressure.

A structural frame 26 for supporting the cells is fastened to the resilient part 6, in this case at the base 16 and/or at the structural part 8, by any kind of means. The frame 26 may, for example, have a foot 27 adjacent to the base 16; broken lines indicate an example of a joint which may be, for example, a screw fastening of a conventional type allowing easy detachment. In the illustrated embodiment, the broken lines showing the joints 10 between the resilient part and the structural part are superimposed on those used to show the fastening of the frame 26. The joints 10 enable the foot 27 of the frame 26 to be supported. The frame 26 may have any kind of shape that enables the cells 20 to be distributed over an area which is extended in height and transversely, and to be supported facing the apertures 19, in this case the channels. It is not necessary to have a cell 20 corresponding to each aperture 19. It is sufficient if the breaking of the cells 20 facing the apertures 19 enables the marking fluid 22 to flow through them. A plurality of frames 26 may be provided in the transverse direction so as to distribute the cells transversely along the bumper.

The frame 26 may have any kind of shape that enables the cells 20 to be held against the front portion 14.

In the illustrated embodiment, the cells 20 are sandwiched between the frame 26 and the front portion 14: the rigidity of the frame 26 enables the cells 20 to be retained in case of impact, and allows them to break under the pressure applied by the front portion.

In the embodiment shown in FIGS. 1 to 4, the frame 26 comprises a housing 30. The housing 30 is held against the front portion 14 with the aid of a rigid arm 32 connecting it to the foot 27. The housing takes the form of a curved comb whose curvature follows that of the front portion 14. The comb comprises a curved wall 34 having ribs 36 forming compartments 38, in which the cells are housed. The housing 30 is placed against the inner surface 40 of the front portion 14: the compartments 38 are thus closed by the surface 40. The cells are held between the wall 34 of the comb, the ribs 36 and the inner surface 40 of the front portion. The arm 32 is fastened by any kind of means to the housing 30; it may also be formed in one piece with the housing 30.

In the illustrated embodiment, the marking fluid cells 20 are provided at least partially along the inner curvature of the front portion, facing the apertures. A single cell 20 is provided on each longitudinal axis. For greater efficiency, or, in other words, to enable the marking fluid to flow within the apertures 19, the cells 20 must be as close as possible to the ends of the apertures. According to the illustrated embodiment, the cells 20 are in contact with the inner surface area 40 of the front portion 14. It is possible to provide a number of cells longitudinally.

The cells 20 are distributed so as to extend in height over at least a part of the extension of the curved surface of the front portion 14. In the illustrated embodiment, they extend over more than half of the height of the curved surface of the front portion 14. In the illustrated embodiment, the cells 20 are distributed symmetrically with respect to a central horizontal plane X-X. They are concentrated in the front end part of the front portion.

The cells 20 are not completely integrated into the resilient part, as this would require a very severe impact to enable the fluid to be released from the cells; nor are they completely outside this part, as this would expose them to any type of impact for which, for example, it is undesirable for the fluid to be discharged. The cells are protected inside the cavity 15 formed by the resilient part of the bumper, while the fluid is allowed to flow out of the bumper through the apertures 19 if there is a collision.

Figure 5:
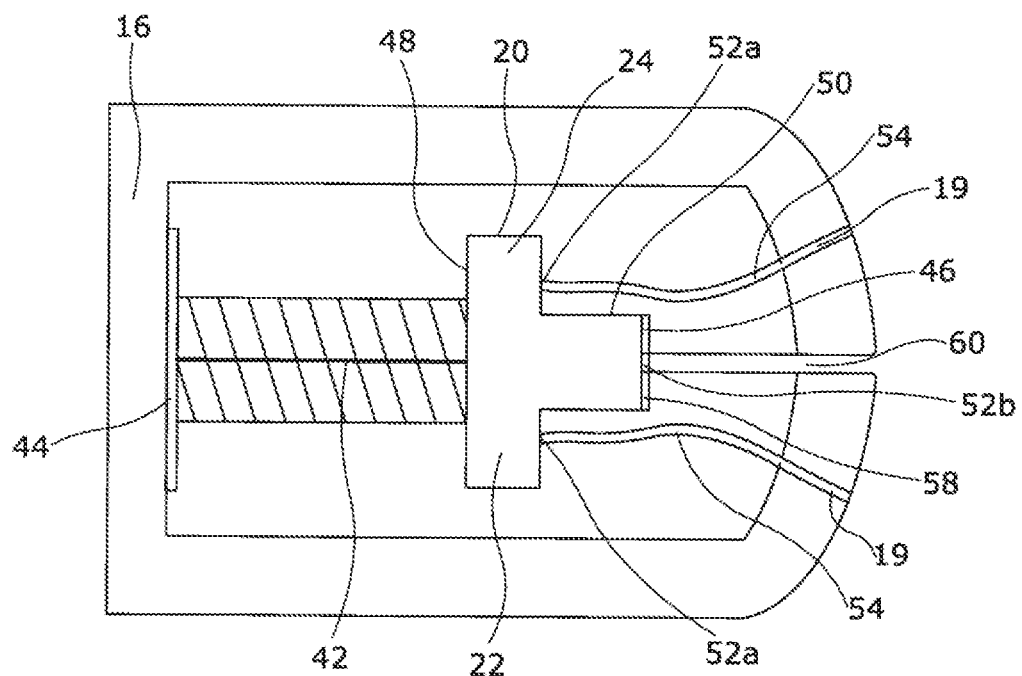
FIG. 5 shows a simplified schematic view in vertical longitudinal section of another embodiment of the resilient part of a bumper of a ground support vehicle.

According to another embodiment of the cell 20 shown in FIG. 5, only one cell 20 is provided vertically within the cavity 15. However, it would be possible to provide a plurality of cells of the same type in another embodiment in which the dimensions of the cells enable a plurality of cells to be positioned vertically. A number of cells are provided in the transverse direction, or a single cell, extending transversely, is provided.

The cell is held inside the cavity by at least one arm 42 connecting it to a foot 44, in the same way as for the housing described above. The foot 44 is fastened to the resilient part in the way described above.

By contrast with the previous description, the cell casing is not designed to break. The fluid is projected through the apertures 19 by pressurizing the fluid, using a piston 46. The cell has a shape that enables it to receive a piston. The principle is as follows: at the time of an impact, the piston 46 is actuated and is introduced into the cell, which, by pressure, causes the fluid to flow through openings provided in the cell casing.

In the illustrated embodiment, the casing 48 of the cell may have any type of shape that has a constriction 50 in which the piston 46, having a corresponding contour, can slide. In the illustrated embodiment, the cell is T-shaped. More precisely, it could, for example, have two cylindrical parts, one of which has a smaller diameter. The whole of the cell whose constricted part is closed by the piston 46 forms the reservoir 24. Holes 52a are formed in the part having the larger dimensions. Flexible tubes 54 connect the holes 52a to apertures 19. The piston 46 is formed by a head 58 and a rod 60, both rigid. The head 58 of the piston is positioned facing an aperture 19: thus the rod 60, which is hollow, connects an aperture 19 to a hole 52b provided in the head 58 of the piston. The fluid is chosen to have a viscosity such that it does not flow out of the cell through the holes 52 when there is no collision, that is to say, when the piston is in the end position shown in FIG. 5, corresponding to a maximum internal volume for the reservoir 24.

When there is an impact on the resilient part 6, the piston 46 is pushed into the cell by deformation of the front wall 14, and exerts a pressure on the fluid, which then flows through the holes 52 and through the piston rod 60 and the tubes 54.

Any other embodiment based on the same principle would be feasible. For example, the piston head might not be located facing a hole 19 and the rod might not be hollow. In the latter case, the fluid flows only through the holes 52a.

The fluid is projected under the effect of the pressure in the form of jets.

The marking fluid 22 comprises any type of fluid enabling a trace to be left on the surface on which it is discharged. The cell 20 has a shape and the fluid has a viscosity such that the fluid 22 may flow through apertures, that is to say, in the illustrated example, through the channels 19.

The marking fluid 22 is preferably washable, so that it can be removed subsequently from the surface on to which it is discharged, after the impact has been detected, inspected and treated. If the collision has caused no damage, the vehicle that has been subjected to the impact may then be brought back into service immediately.

The marking fluid 22 may comprise, for example, a washable paint having a viscosity chosen according to the various parameters detailed above. However, any other type of fluid could be suitable, such as a washable ink, for example.

According to a particular embodiment, the marking fluid 22 may have luminescent properties for revealing the impact in darkness.

The system operates in the following manner:

As shown in FIG. 2, when the vehicle 2 collides with a surface, for example, when a ground support vehicle 2 collides with the fuselage 62 of an aircraft, if the intensity of the collision may cause damage to the fuselage 62 of the aircraft, the pressure exerted on the front portion 14 of the resilient part 6 is transmitted to the cells 20.

In the embodiment shown in FIG. 2, the casings of some of the cells that are sandwiched between the front portion 14 and the cell support frame 26 break, and the marking fluid 22 contained within them is discharged through the channels 19 to spread over the surface with which the vehicle has collided.

In the embodiment shown in FIG. 5, the pressure exerted on the front portion 14 is transmitted, more precisely, to the piston 46 which exerts a pressure on the fluid contained in the cell 20. Under the effect of the pressure, the fluid is discharged through the channels 19 in the form of jets to spread, as previously, over the surface with which the vehicle has collided.

The marking fluid 22 has properties such that it leaves a visible trace 64 on the surface in question. When the vehicle moves away from the surface (FIG. 3), the surface is marked and the impact is thus visible to the eye. The impacted area is delimited and it is possible to determine very rapidly whether the surface has been damaged. The fluid may then be removed from the surface to enable the surface to be treated, or, in the illustrated example, to bring the aircraft back into service immediately, if no damage is found.

The structure of the fuselage may be locally damaged and deformed: a repair must then be made locally and the impacted area is rapidly located.

Since at least some of the cells have been emptied due to the impact, the bumper is easily renewed by replacing the resilient part. In the illustrated example, the resilient part 6 simply has to be separated from the structural part 8 by unscrewing it, and replaced with a new resilient part 6 ready for use. Thus the renewal of the bumper is easy and rapid.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bumper for a vehicle, comprising:
   at least one part made of resilient material, having a curved front portion forming an inner cavity,
   the front portion having apertures enabling said cavity to be put into communication with an exterior of said at least one part,
   at least one marking fluid cell provided inside the cavity, wherein the at least one marking fluid cell comprises a casing made of a material and having dimensions such that the casing breaks under an effect of a specified pressure to deliver a marking fluid within the at least marking fluid cell through the apertures, wherein at least the at least one marking fluid cell is kept facing the apertures by means of a structural frame, the at least one marking fluid cell being sandwiched between the frame and the front portion, and
   a fastener configured to fasten said at least one part to said vehicle.

2. The bumper according to claim 1, wherein the at least one marking fluid cell is at least partially positioned along the curved front portion, facing said apertures.

3. The bumper according to claim 1, wherein the apertures are of cylindrical shape with a circular cross section.

4. A vehicle equipped with a bumper according to claim 1, the one part made of resilient material being positioned at least partially in an outer peripheral part of the bumper.

5. A method for marking a surface, in which a vehicle according to claim 4 is involved in a collision, comprising a step:
   exerting a pressure on the at least one cell, at a time of the collision, by the front portion of the at least one part, causing marking fluid in the at least one cell to flow through at least one aperture.

* * * * *